J. A. BROWN.
Corn-Planter.
No. 19,126.
Patented Jan. 19, 1858.
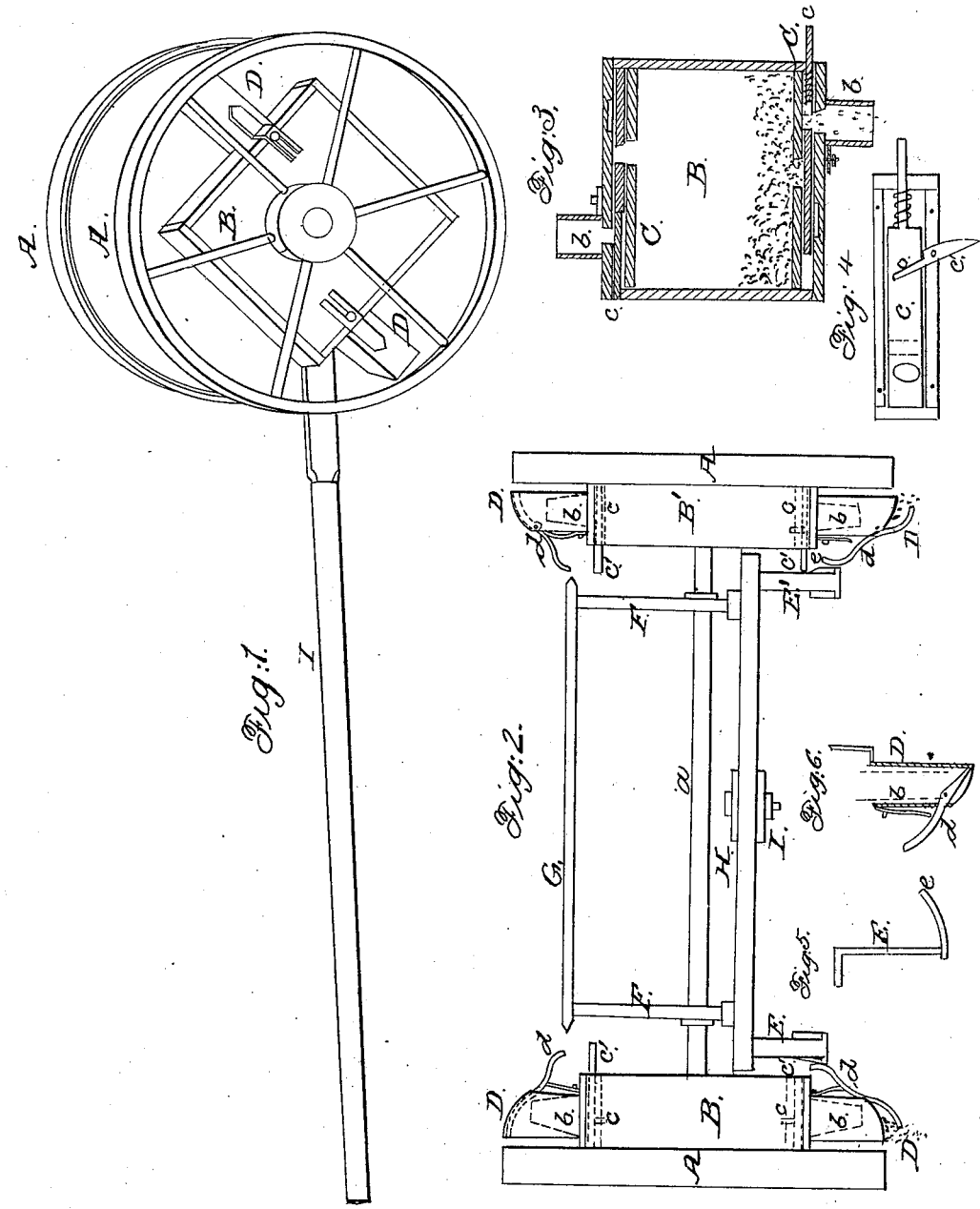

UNITED STATES PATENT OFFICE.

JOHN A. BROWN, OF RICHMOND, INDIANA.

IMPROVEMENT IN SEED-PLANTERS.

Specification forming part of Letters Patent No. 19,126, dated January 19, 1858.

*To all whom it may concern:*

Be it known that I, JOHN A. BROWN, of Richmond, in the county of Wayne and State of Indiana, have invented a new and useful Improvement in Corn - Planters; and I do hereby declare that the following is a full and exact description of its construction and mode of operation, reference being had to the accompanying drawings, and to the letters of reference marked thereon.

The nature of my invention consists in fixing two or more revolving seed-boxes upon a revolving axle, so that they revolve with the axle, instead of placing them upon the frame of the machine, as heretofore, or upon the spokes of the wheel or around the hub; and also in operating the distributing devices by means of a peculiarly-shaped arm projecting from the frame of the machine.

Figure 1 is a perspective view of my invention. Fig. 2 is a back view. Fig. 3 is a section of one of the seed-boxes. Fig. 4 shows a slide, $c$, and its relations. Fig. 5 shows a side view of arm E. Fig. 6 is a section of a discharging-tube, D.

A A' are two burden-wheels, upon which the machine is borne. Wheel A is firmly fastened upon its shaft or axle $a$, to which it gives motion, while wheel A' is fitted loosely upon the other end of the same axle.

$a$ is an iron shaft or axle, connecting wheels A A', and having bearings in uprights F F, and also seed-boxes B B' are firmly secured upon it and revolve with it.

B is a seed-box, whose construction is shown at Fig. 3. It is fixed upon shaft $a$, nearly in contact with wheel A. It has upon opposite sides contrivances for the distribution and discharge of the seed. This box should be large enough to contain half a bushel, or more, of seed, with one side removable, for the admission of the seed.

B' is a box similar to box B, close to wheel A', as shown.

$b\ b$ are tubes placed upon the seed-orifices of box B, Fig. 2, conveying the seed to the discharging-tubes D D.

C C are diaphragms or partitions separating seed-slides $c\ c$ from the interior of the box.

$c$, Fig. 4, is a slide, whose office is to distribute or measure the grain. One end is rounded and passes out through the side of the box. Upon this round portion is a spiral spring, which serves to throw the slide back to position when released from tappet $c'$.

$c'$ is a tappet passing through the side of the box. Its inner end is in contact with a stud upon slide $c$, and its outer end comes in contact with the arm E as the boxes B B' revolve.

D, Fig. 6, is a planting-tube. It receives the seed from tube $b$ and deposits it in the earth. There are four of these planting-tubes, two upon each of the boxes B B'. Each of the tubes D is armed with a spade or valve, $d$, which is opened at the proper time to deposit the seed by contact with that portion of arm E marked $e$, as shown in Fig. 2.

E is an arm projecting beneath the frame of the machine. Its shape is shown in Figs. 2 and 5. The perpendicular portion operates the tappets $c'\ c'$. Its horizontal part opens the tubes D D by lifting the valves or spades $d\ d$, thereby discharging the seed.

F F G H constitute the frame of the machine. They are so simple as to require no description.

I is the pole or tongue.

Operation: This machine is drawn by two horses. As the seed-boxes revolve the tappets first come in contact with the arms E E. This moves the slides to the position shown at the bottom of Fig. 3, and allows the seed to fall upon the spades or valves $d\ d$. The levers of these valves now come in contact with the horizontal parts $e\ e$, opening the valves and discharging the seed into the earth. The other set of tubes follow in a similar manner, and thus they operate alternately till the required labor is performed.

This machine is simple in construction, and not liable to breakage or other injury.

I am aware that corn-planters are in use in which the seed-boxes are attached directly either to the spokes or hubs of the wheels. My invention, however, is quite distinct from these, inasmuch as in mine the boxes are attached to the axle, from which one wheel may be loose and free to move without the seed-boxes, as herein shown; but

What I claim as my invention, and desire to secure by Letters Patent, is—

The arrangement of seed-boxes B B' upon axle $a$, in combination with the distributing and discharging devices herein shown, said devices being operated by the arms E E, as set forth.

JOHN A. BROWN.

Attest:
JOHN FINLEY,
GEORGE TAYLOR.